United States Patent
Pichumani et al.

(10) Patent No.: US 8,200,915 B2
(45) Date of Patent: Jun. 12, 2012

(54) MANAGEMENT OF VERY LARGE STREAMING DATA SETS FOR EFFICIENT WRITES AND READS TO AND FROM PERSISTENT STORAGE

(75) Inventors: Ramani Pichumani, Palo Alto, CA (US); Jonathan L. Sanders, Santa Clara, CA (US); Donald J. O'Riordan, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 751 days.

(21) Appl. No.: 12/264,855

(22) Filed: Nov. 4, 2008

(65) Prior Publication Data

US 2010/0049935 A1 Feb. 25, 2010

Related U.S. Application Data

(60) Provisional application No. 61/091,338, filed on Aug. 22, 2008.

(51) Int. Cl.
*G06F 12/00* (2006.01)
*G06F 7/00* (2006.01)
(52) U.S. Cl. ......... 711/154; 707/797; 707/800; 707/802
(58) Field of Classification Search .................. 711/154; 707/797, 800, 802
See application file for complete search history.

(56) References Cited

U.S. PATENT DOCUMENTS

| | | | |
|---|---|---|---|
| 5,202,981 A | | 4/1993 | Shackelford |
| 5,671,406 A | * | 9/1997 | Lubbers et al. ............... 707/696 |
| 6,175,835 B1 | * | 1/2001 | Shadmon ...................... 707/696 |
| 6,301,578 B1 | | 10/2001 | Harris |
| 7,181,585 B2 | * | 2/2007 | Abrashkevich et al. ...... 711/170 |
| 7,330,927 B1 | * | 2/2008 | Reeve et al. ...................... 711/1 |
| 7,613,796 B2 | * | 11/2009 | Harvey et al. ................. 709/220 |
| 7,827,375 B2 | * | 11/2010 | Abrashkevich et al. ...... 711/170 |

OTHER PUBLICATIONS

Cho, S. and Sartaj, S., "Weight-Biased Leftist Trees and Modified Skip Lists", Journal of Experimental Algorithmics (JEA) vol. 3, Article No. 2 (1998) Association for Computing Machinery, New York, N.Y., pp. 1-27.

McGaughy, B. et al., "Advanced Simulation Technology and it's Application in Memory Design and Verification", Invited Talk 1, Proceedings 2005 IEEE International Workshop on Memory Technology, Design, and Testing, MTDT 2005, Aug. 3-5, 2005, Taipei, Taiwan, pp. xv-xx.

(Continued)

*Primary Examiner* — Kevin Ellis
*Assistant Examiner* — Mehdi Namazi
(74) *Attorney, Agent, or Firm* — Schwegman, Lundberg & Woessner, P.A.

(57) ABSTRACT

A method to produce a reverse skip list data structure in a computer readable medium, comprising: inputting streamed data to packets created in a temporary memory so as to create a sequence of packets; upon completion of creation of a packet in the stream, transferring the completed packet from the temporary memory to persistent memory; providing each of a plurality of respective packets with a respective pointer that skips over at least one other packet in the packet sequence and that indicates a location in persistent memory of a different respective packet in the packet sequence that was transferred to persistent memory prior to such providing of the respective pointer.

31 Claims, 10 Drawing Sheets

OTHER PUBLICATIONS

Okhonin, S. et al., "Zero Capacitor Embedded Memory Technology for System on Chip", Invited Talk 2, Proceedings 2005 IEEE International Workshop on Memory Technology, Design, and Testing, MTDT 2005, Aug. 3-5, 2005, Taipei, Taiwan, pp. xxi-xxv.

Pugh, W., "Skip Lists: A Probabilistic Alternative to Balanced Trees", Algorithms and Data Structures, J. Vitter, ed., Communications of the ACM, Jun. 1990, vol. 33, No. 6, pp. 668-676.

Pichumani, Ramani, unpublished U.S. Appl. No. 11/580,535, filed Oct. 13, 2006, "Scalable Storage and Retrieval of Multiple Asynchronous Signals", 35 pages.

Pichumani, Ramani, unpublished U.S. Appl. No. 11/228,281, filed Sep. 16, 2005, "Method and System for Displaying Large Data Signals", 29 pages.

* cited by examiner

MANAGEMENT OF VERY LARGE STREAMING DATA SETS FOR EFFICIENT WRITES AND READS TO AND FROM PERSISTENT STORAGE

CROSS-REFERENCE TO RELATED APPLICATION

The subject matter of this application claims priority to commonly-owned U.S. Provisional Patent Application Ser. No. 61/091,338 entitled "MANAGEMENT OF VERY LARGE STREAMING DATA SETS FOR EFFICIENT WRITES AND READS TO AND FROM PERSISTENT STORAGE," filed on Aug. 22, 2008, which is expressly incorporated herein by this reference.

BACKGROUND OF THE INVENTION

1. Field of Invention The present invention relates to signal processing generally and more particularly to the writing and reading of streaming data involving very large data sets to and from persistent mass storage.

2. Description of Related Art

As computer-based simulations of dynamic systems such as integrated circuit designs become larger and more complex, the sheer volume of data generated by such simulations is rapidly exhausting the ability of analysis tools to manage and post-process such data. Modern analog/mixed signal simulators produce very large simulation waveform datasets. Recent simulation technologies allow for the creation of datasets with millions of signals, each with millions, or even billions of samples per signal. For example, a large simulation signal may include on the order of $10^7$ or $10^8$ samples/signal. A wide simulation data set may include on the order of 10K or more signals. Specifically, for instance, a PLL circuit design may include on the order of 25 nodes for which a signal is produced during a simulation and in which each signal comprises on the order of 100M samples and are iterated over 1000 different temperature conditions and operating points. Moreover, a CPU circuit design may include on the order of 10M nodes for which a signal is produced during a simulation and in which each signal comprises on the order of 40K samples.

Existing signal database and post-processing technologies have significantly lagged the performance and scalability requirements of these leading edge circuit designs as well as the next generation designs. With the advent of nanometer technology, the analysis of parasitic effects has become more important in verifying design functionality, timing and power. This requires simulation tools not only to handle large memories but also to analyze the effects of hundreds of millions of parasitic elements. As a result, there has been a need for improvements in storage, retrieval, generation, display, and post-analysis of very large simulation waveform data sets.

Thus, a significant challenge in representing very high volume time-series data is organizing and storing the information in a manner that permits high-performance reading, writing, and visualization of such data. While some conventional schemes allow for rapid output and storage of very large data sets, they generally do not facilitate rapid reading of the stored data. Conversely, other existing schemes may allow for rapid retrieval of data, but do not facilitate rapid storage of the data. Still others may provide both rapid reading and writing of data, but do not facilitate post-analysis, manipulation, or visualization of stored data.

There are several different existing approaches to the management of very large and/or wide simulation waveform data sets. For example, one approach referred to as 'Parameter Storage Format' (PSF) involves output of simulation data quickly to the storage media with minimal organization, data indexing, and with minimal or no support for downstream post-processing requirements. Another approach involves indexing and organizing data into logical sectors with database tables to speed the search process for location and retrieval of data during post-processing stages. Yet another approach optimizes the storage of data structures to speed up access and retrieval of specific time segments or specific data resolutions. Still another existing approach involves a hierarchical waveform database that involves a combination of the PSF and indexing and organizing approaches.

Unfortunately, there have been shortcomings with each of these prior approaches. For example, a limitation of PSF is slow read performance for post-processing, analysis, and visualization tasks that require the ability to quickly find and retrieve desired data segments on demand. A limitation of the above-mentioned indexing and organizing approach is the inability to retrieve whole or specific data segments at arbitrary resolutions required for fast waveform display rendering or post-analysis. That is, post-processing is performed at the full resolution that the data was stored in, not the desired resolution when being analyzed or displayed. A limitation of a hierarchical waveform database is the large memory overhead required to generate hierarchical tree structures as well as the inability to scale to very large signal sets (e.g. on the order of one million signals or more).

A fundamental challenge to each of these prior approaches has been the need to achieve improved storage and retrieval of very large simulation waveform data sets without significantly degrading the performance of the simulation engine that generates such data sets. More particularly, there has been a need to write to mass memory the data produced by the simulator without slowing the simulator and to do so in a manner that facilitates retrieval and post-processing. In general, fast writes can be achieved through FIFO buffered data with block I/O system calls. Conversely, fast reads can be achieved by organizing and structuring the data to add more retrieval information such index tables or hints. However, memory management involved with structuring the data at write-time to improve read-time and/or post-processing performance can lead to consumption of CPU and memory overhead shared by the simulator, resulting in reduced simulator performance.

Of course, there are numerous existing techniques to organize data storage so as to achieve efficient data retrieval. FIG. 1 is an illustrative drawing representing a typical prior linked list structure used to search for data ordered in a list structure. Each element may correspond to a block of data stored in computer readable memory, for example. A plurality of ordered elements is linked in sequential order in a list in which each given element in the list includes a pointer indicative of a location of a next sequential element in the list. That is, a pointer points to a memory location, or file offset location, of a next sequential element in the list, and in which an element sequentially preceding such given element in the list structure points to a memory location of the given element. Thus, for example the pointer in the element labeled 17 points to the memory location of element labeled 19, and the pointer in element labeled 19 points to the memory location of element labeled 21. Retrieving an element linked in such a list from memory typically involves sequentially traversing the list element-by-element until the sought after element is located. For instance, locating element labeled 21 typically would involve starting at the head of the list labeled "a" and following pointers to elements 3, 6, 7, 9, 12, 17, 19 and 21, respectively. Unfortunately locating an element in a sequential linked list such as that of FIG. 1 is relatively inefficient, O(n), and slow especially for large lists.

The skip list is an example of an improved prior technique to organize data for efficient retrieval. FIG. 2 is an illustrative drawing representing a skip list structure. In simple terms, a skip list is a sorted linked list. However, while the nodes in an ordinary linked list such as that of FIG. 1 have one 'next' pointer, the elements of a skip list may have multiple 'next' pointers, referred to as forward references. Moreover, the number of forward references for a given element in a linked list may be determined probabilistically. Skip lists allow intermediate elements in a list between a given element and a sought after element to be skipped resulting in expected O(log n) performance, which is a significant improvement over ordinary linked lists. A search through a skip list involves traversing forward pointers that do not overshoot the sought after element. When no more progress can be made at a current level of forward pointers, the search moves down to a next level of pointers.

For example, searching for the element labeled 21 in the skip list of FIG. 2 involves starting at forward skip list tail "T$_f$" and following its top level pointer (L3), which is indicative of the location, such as actual memory location or file offset location, of the element labeled 6 and then following the next lower level pointer (L2) in element labeled 6, which points forward to the memory location or file offset location of element labeled 25. Element 25 is disposed after the sought after element 21 in the skip list, and the L2 pointer to the location of element labeled 25 overshoots the sought after element 21. Thus, the search moves forward to the next level pointer (L 1) in element 6, which points to the location of element labeled 9. Element 9 is disposed in the list before the sought after element 21. Therefore, the search continues at that same level L1 from element 9. The L1 pointer in element 9 points forward to the element labeled 17. The L1 pointer of element 17 points forward to the location of element 25. Since the L1 pointer from the element labeled 17 overshoots the sought after element labeled 21, the search moves down to the L0 pointer of element 17, which points to element labeled 19. The L0 pointer of element 19, in turn, points to the sought after element labeled 21. Therefore, the search is complete.

Modified skip lists that use bi-directional pointers and child pointers have been proposed. This proposed approach showed improved search performance in certain cases. However, this can be a disadvantage in computing environments where memory overhead is a critical issue.

Thus, there has been a need for improvement in the processing of very large, very wide data sets that more efficiently achieves an organization of the data in the course of writes to persistent storage that facilitates subsequent efficient retrieval and post-processing of the data. The present invention meets this need.

SUMMARY OF THE INVENTION

In one aspect, a reverse skip list data structure is produced. Streamed data is inputted to primary memory. Creating an ordered sequence of packets to contain the streamed data. The created packets are transferred to a persistent secondary storage as the streaming of data continues. Creation of the packets involves creation of a different respective pointer for each of a plurality of respective given packets in the packet sequence. The respective pointer for each such respective packet skips over at least one other packet in the first packet sequence. Furthermore, the respective pointer for each such respective packet indicates a location in the secondary storage of a different respective packet in the first packet sequence that was transferred to second memory prior to creation of that respective pointer.

Thus, a skip list is produced that speeds subsequent retrieval of packetized streamed data from the secondary storage. Moreover, a reverse skip list is produced. Packets are created in the primary memory and are then transferred to the secondary storage. The packets are created in primary memory with pointers that indicate locations in secondary storage of packets previously created and transferred to secondary storage. Since the locations in secondary storage of the previously created packets are known at the creation time of later created packets, there is no need to perform a seek or to retrieve such previously created packets to ascertain their secondary storage locations.

In another aspect, the data stream includes multiple data threads, and different packets sequences are created to contain the data of the different threads. The packet sizes of a respective packet from the packet sequences is limited based upon a prescribed packet size limit applicable at the time of creation of such respective packet. That limit may be adjusted in the course of inputting the streamed data to the first memory based at least in part upon the number of different respective threads currently within the streamed data that is being inputted. Thus, buffer space in the first memory that is allocated to packetizing the data of a given thread is adjusted based upon the number of threads currently flowing within the data stream.

In yet another aspect, a plurality of packets in a given packet sequence may include multiple pointers that indicate memory locations in second memory of multiple other packets in that same given packet sequence. For each one of that plurality of packets, a determination is made as to a number of pointers to provide to such packet based at least in part upon one or both of a priority assigned a thread corresponding to the given packet sequence and the number of packets already created in the given packet sequence at or about the time of creation of such packet. The speed and efficiency of a search through a skip list depends in part upon the number of pointers available to skip from one packet to another. Therefore, number of pointers can be varied based upon thread priority and the number of packets in a thread in order to optimize search and retrieval time.

These and other features and advantages of the invention will become apparent from the following description of embodiments thereof in conjunction with the appended drawings.

BRIEF DESCRIPTION OF THE DRAWINGS

The aforementioned features and advantages of the invention, as well as additional features and advantages thereof, will be more clearly understandable after reading the detailed description of embodiments of the invention in conjunction with the following drawings.

DESCRIPTION OF PREFERRED EMBODIMENTS OF THE INVENTION

The following description is presented to enable any person skilled in the art to make and use a computer implemented system, method, and apparatus to use reverse skip list structures to store streamed data in accordance with embodiments of the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
FIG. 1 is an illustrative drawing representing a typical prior linked list structure.
Figure 2:
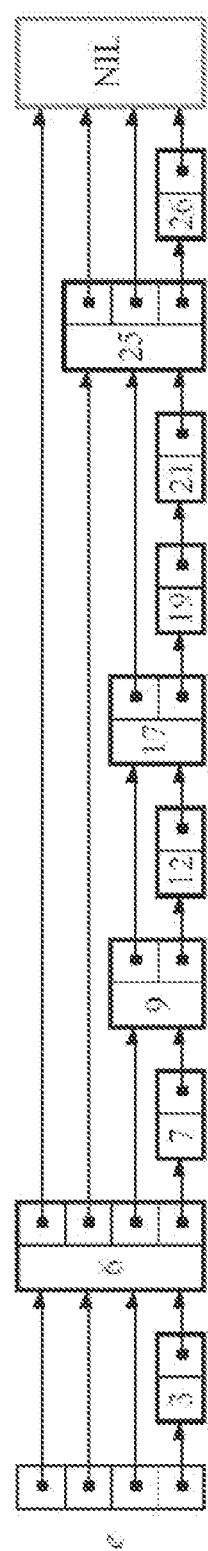
FIG. 2 is an illustrative drawing representing a prior skip list structure.
Figure 3:
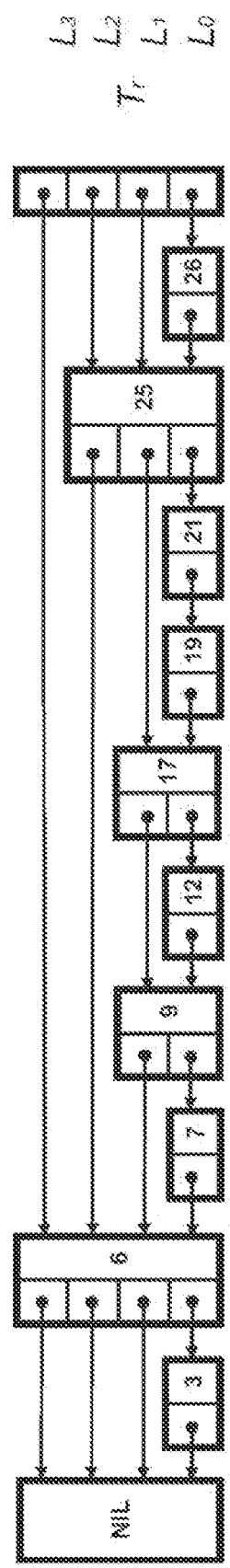
FIG. 3 is an illustrative drawing representing a reverse skip list having a multi-level hierarchical index structure in accordance with some embodiments of the invention.

FIG. 3 is an illustrative drawing representing a reverse skip list having a multi-level hierarchical index structure in accordance with some embodiments of the invention. The reverse skip list comprises an ordered set of elements. Each element may correspond to a block of data stored in computer readable memory, for example. Each element may have multiple 'next' pointers, referred to as backward references. Traversal of a reverse skip list is similar to traversal of a forward skip list except in the opposite direction. Intermediate elements in a reverse skip list between a given element and a sought after element can be skipped improving search efficiency. A search through the reverse skip list of FIG. 3 involves traversing reverse pointers organized in a multi-level index structure. Pointers at a given level of the index structure are followed from one element to the next within that given level of the index structure until the sought after element is reached or is overshot. When no more progress can be made through the index structure at that given level without overshooting the sought after element, the search moves down to a next level of pointers in the index structure. Elements at the lowest level of the index structure have pointers that link elements to the next element in order directly, with no skipping over intermediate elements. Once a search reaches the lowest pointer level, the search proceeds much the same as for an ordinary linked list. This search pattern continues resulting in a convergence upon the sought after element.

For example, searching for the element labeled 7 in the reverse skip list of FIG. 3 involves starting at reverse skip list tail "$T_r$" and following a top level pointer (L3) to the location, such as actual memory location or file offset location of element labeled 6. Element 6 is disposed in the reverse skip list before the sought after element 7, which means that the pointer to the element labeled 6 overshoots the sought after element 7. Thus, the search moves to the next level down pointer (L2) in $T_r$, which points back to the location of the element labeled 25. Element 25 is after sought after element 7. Therefore, the search moves back to the current level pointer (i.e. L2) of the element labeled 25. The L2 pointer of element 25 points back to location of the element 6, which is located before the sought-after element 7 and, therefore, overshoots the sought after element 7. So the search moves down to the next level pointer (L1) of element 25, which points to the location of the element labeled 17, which is disposed after the sought after element 7 in the skip list. Thus, the search moves back to the L1 pointer of element 17, which points to location of the element 9, which is disposed after element 7 in the skip list, which means that the L1 pointer of element 17 does not overshoot the sought after element. The search, therefore, moves back to the L1 pointer of element 9. The L1 pointer of element 9 points to location of the element 6, which is an overshoot of sought after element 7. Thus, the search moves to the next level down pointer (L0) in element 9, which points back to the location of the sought after element labeled 7.

In accordance with some embodiments of the invention, the skip list elements comprise data packets that contain signal data representing the results of simulation of an integrated circuit design. Each packet may represent a group of signals within a time increment represented in the simulation. Packets are ordered monotonically with time such that a sequence of packets may represent signal values over the course of a multiplicity of time increments spanned by such packet sequence. From a practical standpoint, applications such as circuit simulation involve writing huge amounts of packet data to persistent memory, such as to disk. The use of reverse skip lists in accordance with embodiments of the invention is highly efficient for both reading and writing of high volume sequential data while imposing minimal memory and CPU overhead.

In accordance with some embodiments of the invention, reverse skip list elements organized as data packets are written to computer readable memory in monotonic order. For example, assume that each element in FIG. 3 comprises a data packet, and that each packet's monotonic order in the list is represented by its numeric label. In that case, the packet represented by element 3 is written to memory followed by the packets represented by elements 6, 7, 9, 12, 17, 19, 21 25 and 26 in that order, respectively. Thus, the reverse pointers of the skip list of FIG. 3 point in the direction of the beginning of the list, i.e. toward the 'head' end of the skip list, and the subsequent packets are appended at the 'tail' end of the list, one after the other in monotonic order.

It will be appreciated that creation of a skip list index structure, whether a forward or a reverse skiplist index structure, requires that at the time of creation of a pointer from one element to another element, the physical location of both elements should be known. Referring to FIG. 3, for example, the memory location or offset location of the element labeled 3 must be known before creation of the L0 pointer from the index structure of the element labeled 6 to the location of the element labeled 3. Similarly, for example, the location of the element labeled 6 must be known before creation of the L2 pointer from the index structure of the element labeled 25 to the location of the element labeled 6.

Appending elements, e.g., packets, monotonically to the 'tail' end of the skip list ensures that the location of each element to which a pointer is to point is known at the moment in time that the pointer is created. Moreover, appending newly received elements to the 'tail' end of the reverse skip list advantageously permits creation of a portion of the index structure containing pointers to one or more previously appended elements prior to writing of such newly received elements to mass storage. For example, data-containing elements, such as packets, can be stored in a temporary buffer while an index structure for at least a portion of such temporarily stored elements is created. Upon creation of such structure, the temporarily stored elements with an associated index structure containing reverse pointers is permanently stored in the packet stream headers which are then written to mass storage.

Creation of a reverse skip list index structure advantageously facilitates efficient storage and retrieval of streaming of data elements such as data packets. Specifically, in accordance with some embodiments, at the moment that a pointer index structure is created for a newly appended streamed element, the memory address locations or offsets of one or more previously appended elements to which pointers in the index point already will be known. Even more specifically, for example, since pointers of a reverse skip list are built pointing from the tail toward the head and since new data elements are appended to the tail, at the time of their creation, reverse pointers will point to previously appended data elements. Thus, an advantage of the reverse skip list structure is that no backward seeks and updates need to be performed to determine memory locations in persistent storage of packets previously written to persistent storage, as would be the case with forward skip lists, for example. The occurrence of backward seeks and updates during the streaming of data to a persistent storage device could significantly degrade the writing performance to that device.

Streaming as used herein refers to continuing flow of portions of a data set while previously received portions of the same data set are being processed. For example, as simulation results signal data from a large signal continues to be inputted to a temporary buffer, previously inputted portions of that same signal may be in the process of being packetized and flushed to persistent storage. Thus, the signal may flow as a stream, or is streamed, to a temporary buffer substantially continuously (though there may be interruptions from time to time) as the signal is simultaneously processed for efficient persistent storage.

One potential challenge with some prior probabilistic approaches to creation of a hierarchical skip list such as that of FIG. 3 is that the number of levels in a pointer index structure, i.e., the depth of the pointer indices, typically corresponds to an increase in the number of elements in the skip list. That is, increasing the number of elements in a skip list results in the use of more levels of pointers to facilitate rapid 'skips' through the list to arrive in the vicinity of a sought after element. Unfortunately, a large increase in the number of pointers can impose a significant memory management burden involved with keeping track of such pointers, especially in a situation in which pointers are created substantially contemporaneously with receipt of a stream of elements, such as packets. More specifically, for example, the amount of memory and CPU resources allocated to management of the creation of a reverse skip list structure for streaming data contemporaneously with the receipt of such data can make the creation of deep pointer indices impractical due to the processing required for management of a large number of pointers.

Figure 4A:
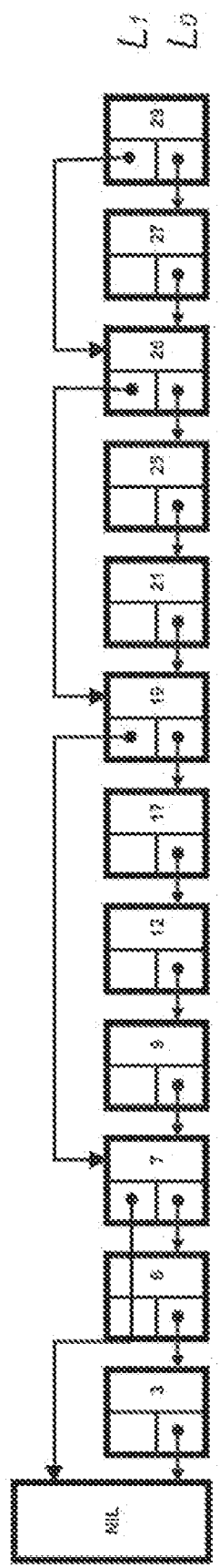
FIG. 4A is an illustrative drawing of a reverse flattened skip list structure in accordance with some embodiments of the invention.

FIG. 4A is an illustrative drawing of a reverse flattened skip list structure in accordance with some embodiments of the invention. Similar to the reverse skip list of FIG. 3, the reverse skip list of FIG. 4A, individual elements of the reverse skip list have backward pointers to lower order elements of the list such that intermediate elements in a reverse skip list between a given element and a sought after element can be skipped to speed a search. However, the pointer indices are 'flattened' in that fewer pointers are included relative to the number of elements in the skip list. That is, the indices are not as deep with pointers. In this example, no element has more than two pointers. Thus, maximum pointer index depth is two. A small to moderate size flattened reverse skip list with only two index levels per signal has expected efficiency O(N/log N).

Moreover, the reverse skip list of FIG. 4A employs a deterministic 'skip factor'. As used herein, the term skip factor signifies the number of elements skipped by a pointer. In particular, in the example skip list of FIG. 4A, a maximum of two levels of pointers are employed, and the skip factor varies deterministically. That is, the skip factor per skip level pointer varies in a predictable manner with relative location within the skip list. In this example, the skip factor varies deterministically, with the number of elements skipped increasing by one with each skip to a lower order in the skip list. For example, the L1 pointer of the element labeled 29 skips one element and points at the element labeled 26. The L1 pointer of the element labeled 26 skips two elements and points at the element labeled 19. The L1 pointer of the element labeled 19 skips three elements and points at the element labeled 7. While this example shows a progressive change in skip factors that involves an increment by constant number, i.e. by one, other progressive skip factor values can be employed consistent with the invention. For example, a progressive skip factor that changes by a multiple of two for each backward skip from one two-level index element to the next could be employed.

Figure 4B:
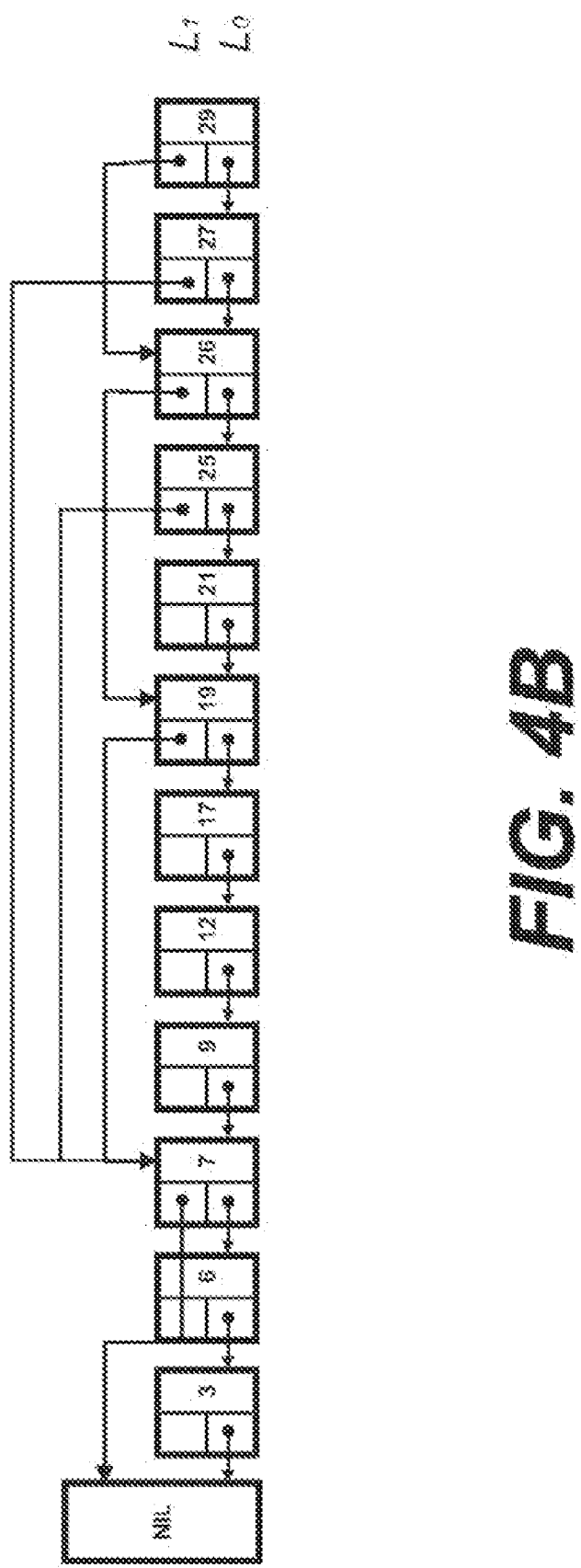
FIG. 4B is an illustrative drawing of the reverse skip list of FIG. 4A in which redundant auxiliary pointers have been added.

FIG. 4B is an illustrative drawing of the reverse skip list of FIG. 4A in which redundant auxiliary pointers have been added. In FIG. 4A, there is one single pointer to element 7 from element 19, which is the only pointer to element 7 (other than the pointer from its most immediate neighbor element 9. In FIG. 4B, the additional auxiliary pointers to element 7 from elements 25 and 27, allow the search for an item like element 7 to start even before all the data is fully written out and facilitates random access (i.e. start the search from anywhere). For example, one application is when viewing partially written data. For example, suppose the data is written in the order 3, 6, 7, 9, 12, 17, 19, 1, 25, 26, 27, and 29. Further, suppose the data is only partially written out (e.g., the simulator has not yet finished simulating and packets 26, 27, 29 have not been written yet). A user may still wish to plot some waveforms even though the simulator has not finished yet, and may start up a waveform viewer application on the partial data represented by packets 3, 6, 7, 9, 12, 17, 19, 21, 25 so far. Since element 25 has been augmented with a redundant pointer to element 7, its now possible to start the search from element 25 directly, and get to element 7 without waiting for the simulation to finish, (or without taking the alternate and slower path from element 25 to element 21 to element 19 to element 7, which would be the case if element 25 was not augmented with the redundant pointer to element 7). It will be appreciated of course that redundant pointers are not limited to flattened skip lists and may be added to non-flattened skip lists as well.

While flattened reverse skip lists are useful for small to moderate size streams of data, larger data streams often do require a deeper hierarchical index structures for efficient search. Unfortunately, as explained above, each additional pointer level incurs additional memory management overhead. Memory management techniques in accordance with embodiments of the invention to efficiently manage reverse skip lists with multi-level pointers are explained below with reference to a multi-threaded stream embodiment.

Figure 5:
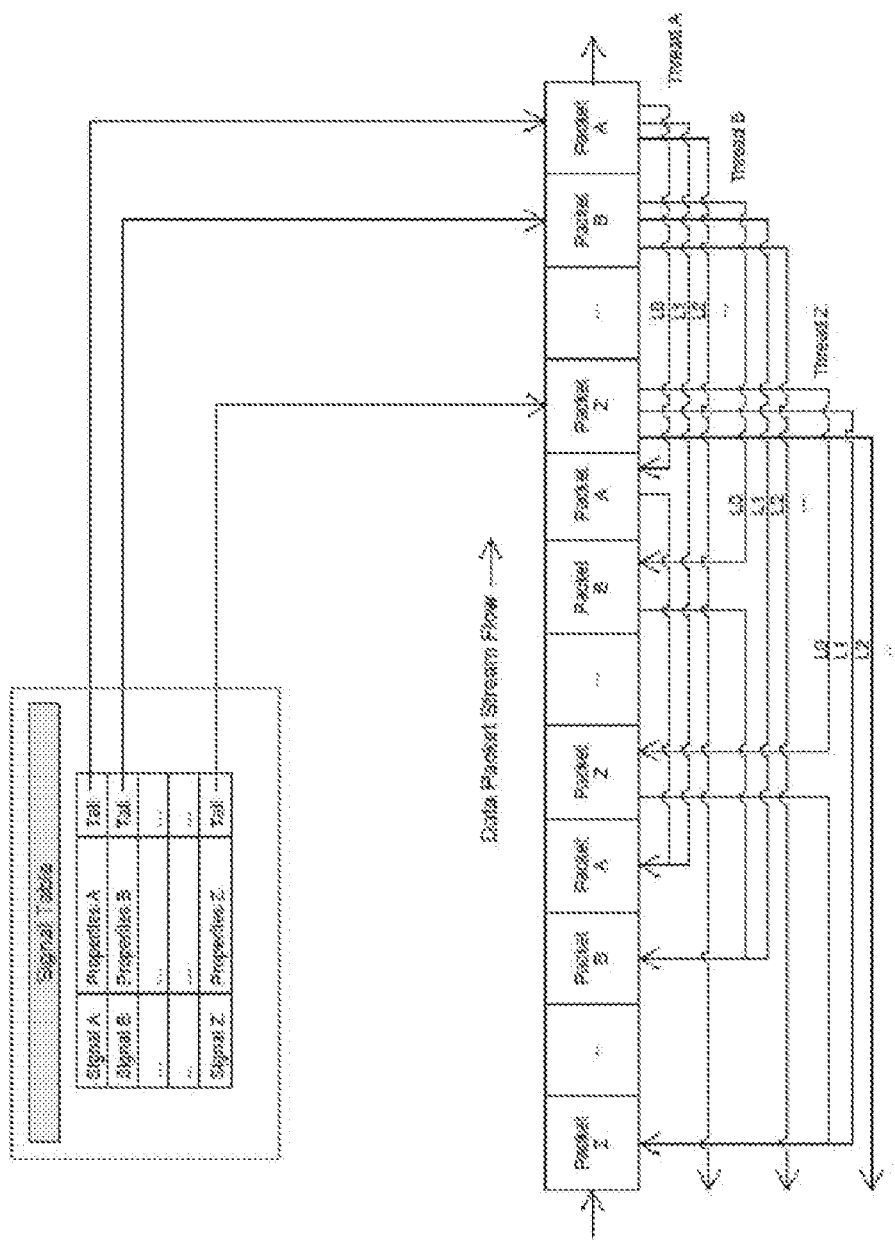
FIG. 5 is an illustrative drawing of a stream of information packets stored in mass memory organized in a reverse skip list in accordance with some embodiments of the invention.

FIG. 5 is an illustrative drawing of a stream of elements stored in mass memory organized in a hierarchical reverse skip list in accordance with some embodiments of the invention. The elements in this example stream comprise information packets. In this example, the packets comprise data produced during a simulation of an integrated circuit design. The packet stream includes multiple packet threads identified as thread "A", "B" . . . "Z" that are interleaved with each other. Different packet threads may correspond to different measurement signal groups produced during the simulation. Moreover, some of the packet threads may comprise synthetic signals derived from the measurement signals.

The direction of stream flow is opposite to the direction of the backward pointers of the reverse skip list. Thus, just as explained above with reference to FIG. 3, newly received packets of FIG. 5 are appended to the tail of the reverse skip list, and the backward pointers point in a direction from the tail of the list toward the head. Thus, packets are stored in the reverse skip list structure in the order in which they are received, and pointers in packets received later point to the memory locations of packets received and stored earlier. As explained above with reference to FIG. 3, the packets of FIG. 5 are initially stored in a temporary buffer prior to storage in persistent memory.

Still referring to FIG. 5, a signal table is shown that sets forth an identifier (e.g., name) and properties for each signal group and that also includes pointers indicating file offset locations of packets of the reverse skip list tail for each of the signal groups (i.e., threads) in mass storage. It will be understood that a file offset indicates a specific location in a given file, e.g., a file offset of 100 would indicate the location of the 100th byte of a given file in persistent memory. Skip lists' tail locations change as additional packets are appended. The list of properties may include global information such as the tail location for each thread, the number of samples in each thread, the data type of each thread (float, double, complex, integer, etc.)

Thus, in accordance with some aspects of the invention, volatile properties such as number of samples and the tail locations are stored in a signal table, separate from the non-volatile properties such as signal type, and signal hierarchy information. As such, the signal table (which is shown logically in FIG. 5 as a single entity), is actually stored in two different file segments. This arrangement improves the overall efficiency of the table operations. The signal header table is updated as new signal threads are added to the stream and as additional packets are added to reverse skip lists corresponding to existing signal threads.

Packets within a thread are linked through reverse pointers. The index structure comprising the reverse pointers is created while the packets are in a temporary memory buffer. Within stream "A", for example, the index structure of packet $A_N$ includes an L0 reverse pointer to a location of packet $A_K$, an L1 reverse pointer to a location of packet $A_G$, an L2 reverse pointer to a packet (not shown) further back in stream "A", and may include additional reverse pointers (not shown) to other packets (not shown). Packet $A_K$ includes an L0 reverse pointer $A_G$ and also includes additional pointers (not shown) to other packets of thread "A". The packets of threads "B" through "Z" also contain hierarchical reverse pointer indices. The pointer structures may differ from one packet thread to the next as explained more fully below.

Pointers may be redundant. Specifically, for example, both the L1 pointer of packet AN and the L0 pointer of packet AK point to packet AG. One advantage of redundant pointers is that they can improve the search performance by providing visibility of "hidden" pointers that are obscured by intermediate packets. For example, in FIG. 3, the L0 pointer at element 9 back to element 7 is hidden by element 17.

In this example the packets are organized into their threads monotonically with respect to the time variable. That is, the packets contain signal values that are ordered monotonically in a time series order. Thus, the order of the packets in the reverse skip list is a time series order, and the reverse pointers point in a reverse time direction, from earlier-received packets toward more recently received packets.

Pointer index structures that indicate persistent memory locations or references to such locations are efficiently created during the temporary buffering of packets. More particularly, as explained above, reverse pointers are created contemporaneously with the appending of new packets to the stream tail. Consequently, persistent memory locations of new packets are determined, and pointers to previously received packets are created without the need to retrieve or to update the pointer index structures of such previously received, previously stored packets. A temporary buffer storing the newly received packet data is periodically flushed to persistent memory once it reaches some limit, which may be a variable.

Figure 6:
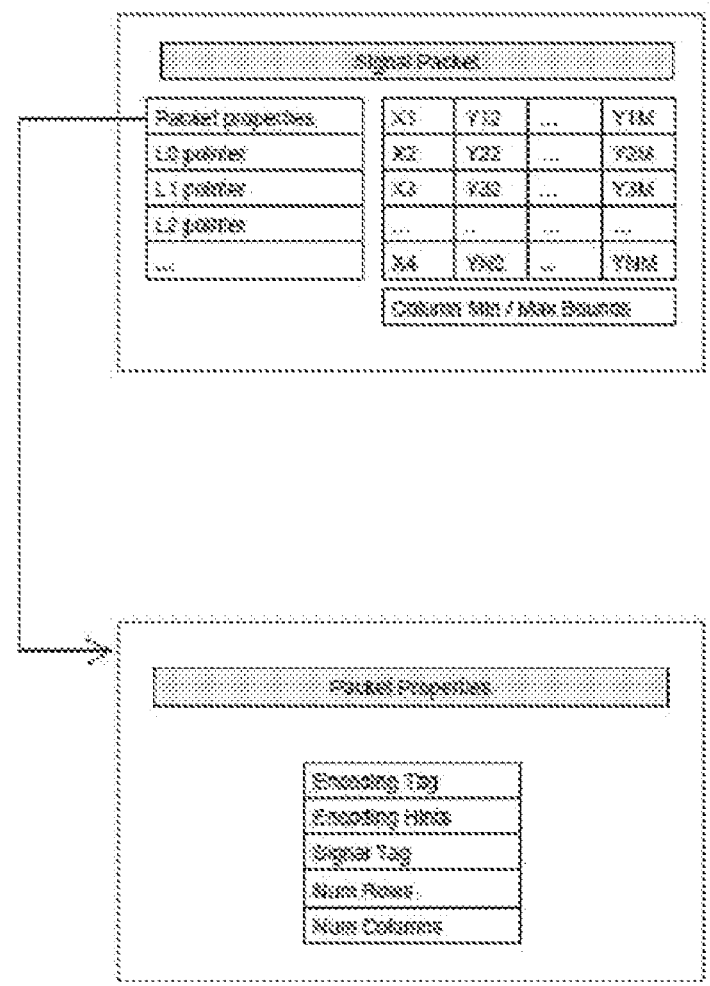
FIG. 6 is an illustrative drawing of an information packet that may represent a portion of a signal obtained from a simulation of an integrated circuit and that is temporarily stored in a buffer memory prior to being added to a reverse skip list stored in mass memory such that of FIG. 5.

FIG. 6 is an illustrative drawing of an information packet that may represent a portion of a signal obtained from a simulation of an integrated circuit and that is assembled and temporarily stored in a buffer memory prior to being added to a reverse skip list stored in mass memory such that of FIG. 5. For example, the packet of FIG. 6 may represent details of packet $A_N$ of FIG. 5. Simulation information for a particular circuit characteristic such as a node of a simulated circuit design often is represented as a 'signal group' that includes multiple waveforms. Each different waveform within a signal group might represent simulation measurements at such a circuit node under different conditions such as different temperatures, but all sharing a common sweep vector (e.g., time sample vector). Simulation information is packaged into a stream of packets a manner that will be well known to persons skilled in the art.

The illustrated packet includes a sub-matrix of x-data sample and y-data values for the waveforms of the signal group. For example, the first column of values of the sub-matrix of the packet may represent the y-data sample values for a first waveform of the signal group associated with a given set of x-data sample values at a given circuit node at a first temperature. The second column of values of the sub-matrix may represent the y-data sample values corresponding to the same x-data sample values for a second waveform of the signal group associated with a given circuit node at a second temperature. The Mth column of values of the sub-matrix may represent the y-data sample values corresponding to the same x-data sample values for an Mth waveform of the signal group associated with a given circuit node at an Mth temperature.

In addition, the example packet includes min/max bounding box values that represent the minimum and maximum sample values for each column of the matrix, i.e. for each waveform. Such min/max information can be used as an approximation of the waveform to quickly produce a visual signal trace from the sample data. The min/max values can be used as a shortcut that indicates the range of values spanned by waveforms represented within the packet for use to quickly produce a visualization of the signal while obviating the need to read all of the multiplicity of waveform samples to determine such min/max information.

The example packet also includes a table containing multi-level reverse skip pointer values. In some embodiments, the number of skip pointer levels within a packet depends upon several factors such as, the priority of the packet's signal group, the number of other packets in the packet's signal group that have been received previously and the amount of memory allocated to buffering. A higher priority signal or signal group may be accorded more pointers than a lower priority signal group. Thus, for example, a packet that is part of a larger signal thread may be allocated fewer pointers than one that is part of a smaller signal thread if that larger signal thread has a lower priority than the smaller thread. A deeper index structure with more pointer levels has more pointers available to achieve faster searches and retrievals of data from persistent storage. However, more memory overhead is required to create and manage a deeper index structure.

In addition, the packet of FIG. 6 includes packet property information useful for decoding the packet. These properties may include information such as, encoding/decoding (CO-DEC) tags, signal tag, and the number of rows and columns in the sub-matrix. Packets within a signal group may be encoded with dynamic compression and dynamic precision. That is, different packets in the same stream thread may be compressed differently and may be encoded differently. For example, a first portion of a signal group may pertain to a time interval during which a simulated circuit is in a transient state, which is of no interest to a user. However, a second portion of the same signal group may represent a time interval during which the simulated circuit has settled to steady state operation, which is of primary interest to the user. Accordingly, a packet (such as $A_N$, for example) representing signal group during the first time interval may be encoded with less precise floating point encoding, while a packet (such as $A_G$, for example) representing the signal group during the second time interval may be encoded with more precise double precision encoding.

Packets of a reverse skip lists are stored temporarily in a memory buffer prior to writing of the packets to persistent storage. One challenge to memory management for a multi-threaded signal stream is that the number of signals to be stored and the number of samples per signal is unknown and may vary. The following is a description of memory management techniques to achieve efficient memory usage through dynamic memory adaptation in accordance with some embodiments of the invention.

A function called putValue( ) is invoked by a client application to generate a signal data stream. Note that such client application forms no part of the present invention and will be readily understood by persons of ordinary skill in the art and therefore, need not be described herein. The putValue( ) function accepts at least two arguments, a signal id and the latest value of the signal that to be streamed out. An independent x-vector data (sweep value such as time) is designated by a special signal id.

Pseudo-code that illustrates an embodiment of the invention in terms of the putValue( ) function for a backward skip list algorithm to generate the multi-threaded signal packet streams is described in TABLE 1. In the pseudo-code of TABLE 1, each signal s represents a signal group as described above with reference to FIG. 6. Thus, for example, packets "A" in FIG. 5 represent one signal group for one signal s.

By way overview, when a new value is received for storage within the temporary memory buffer, a determination is made as to whether the new value is associated with a previously defined data stream or with a new data stream. If the new value is associated with a previously defined data stream, then the new value is added to a packet currently in assembly for that data stream. A determination is made as to whether the size of the packet to which the new value is added exceeds a maximum packet size as a result of the addition of such value to the packet, and if it does, then the packet is flushed to persistent storage. On the other hand, if the new value is not a part of a previously defined stream, then memory buffer space in the temporary buffer is allocated for a new data stream, and if necessary, in accordance with buffer size management policies described below, the packet size limit may be adjusted in view of the addition of another stream. The new value is then added to a new packet to gather data values for the new stream.

TABLE 1

For each data value for a given signal within a current signal group (i.e., all signals within a given packet), invoke PutValue(signal s, value):
  If the signal s is new:
    AllocateStorageFor(s) (allocate storage for a signal s)
    AdjustBufferLimits( ) (see discussion below and TABLE 2)
    AddSignalToGroup(s, group g) (add signals to group based on x-value
    AddToSignalTable(signal, group g) (signal header table as depicted in FIG. 5)
  Else, find the signal's parent group:
    group ← FindParentGroupFor(signal s) (if signal existed previously, add to parent group)
  If the value is also a sweep point (i.e. x-value), then set:
    current_time value (update global time)
  s.number_of_samples++ (sample count for signal s;
"++" denotes "increment by one")
  If maximum number of samples in signal packet s ($m_{AS}$, as defined later in procedure AdjustBufferLimits) is exceeded, then
    FlushPacketStream( ); (if packet is full, then flush the packet to mass memory)
    $m_{AS}$ ← 0
    UpdateRTSFValue(@depth=1); (if packet not full then add data to packet and update the packet's min/max value; RTSF is an acronym used to refer to a particular format)
  Else,
    AppendDataToPacket(signal s, group g, value)
    UpdateMinMaxValues(signal, value) (used for multi-resolution hierarchy, i.e. a tree building multi-resolution tree)

The function AdjustBufferLimits( ) performs the task of managing the total memory overhead of the packet stream data as the number of signals grows over time. There are several parameters that determine the size of the data buffers allocated to signal packets:

1. $M_{GMAX}$ total global memory allocated to all buffers for all signal packets
2. $M_{BMAX}$ maximum buffer memory limit for all signal packets
3. $M_{BMIN}$ minimum buffer memory limit for all signal packets
4. $m_D$ dynamic buffer memory limit for all signal packets
5. $m_{AS}$ actual buffer memory currently used by a signal s
Note: memory usage is measured in units of word size.

As explained below in some embodiments, if the number of new signals doubles, then value of $m_D$ is cut in half. Conversely, $m_D$ may double in value if half the current number of signals go away.

For a given signal, if the number of samples in the signal $m_{AS}$ equals or exceeds the size of the value $m_D$ then the signal is flushed to mass storage. The signal then is allocated a new packet in which the $m_D$ value of that new packet is set at the then current, prevailing $m_D$ size limit, which may have changed due to the addition or deletion of new signals.

The parameters $M_{GMAX}$, $M_{BMAX}$, and $M_{BMIN}$ are constants, whereas $m_D$ and $m_{AS}$ are variables. Furthermore, $$M_{BMIN} \leq M_{BMAX} \leq M_{GMAX}$$

The following invariant is maintained at all times:

$$\Sigma_s m_{AS} \leq M_{GMAX}$$

The algorithm for maintaining this invariant is described by the pseudo-code in TABLE 2.

TABLE 2

```
Initialize:
    num_signals ← 0
    m_D ← M_GMAX
For each new signal added:
    num_signals ← num_signals + 1
    m_D ← M_GMAX / 2^CEIL(log2 num_signals) (quantizes buffer limit changes to
powers of 2, thereby minimizing CPU overhead and memory fragmentation)
    if m_D < M_BMIN, then m_D ← M_BMIN (enforces lower bound on buf size)
    if m_D > M_BMAX, then m_D ← M_BMAX (enforces upper bound on buf size)
    for each signal s s.t. m_AS > m_D, flush packet s and create new packet with limit m_D
    Note that is is possible to use a more aggressive memory usage scheme by letting,
        m_D ← M_GMAX / num_signals
However, this alternate approach would result in greater memory fragmentation, more
frequent flushes, and faster memory exhaustion as the signal count grows and/or shrinks
over times.
```

Thus, memory management in accordance with some embodiments of the invention advantageously dynamically adapts to changing volumes of streaming information, rapidly, while minimizing memory fragmentation and hence, memory exhaustion. Thus, in circuit simulation of applications, increasingly complex circuits to be simulated without sacrificing high performance.

A function UpdateRTSFValue(@depth) is similar to functions described in commonly owned U.S. patent application Ser. No. 11/580,535, entitled, Scalable Storage and Retrieval of Multiple Asynchronous Signals, invented by R. Pichumani et al., filed Oct. 13, 2006, which is expressly incorporated herein by this reference. The patent application discloses a circuit simulation data organized in a hierarchical B-tree data structure that permits traversal at successively deeper levels to retrieve data at a desired resolution. In accordance with some embodiments of the present invention, a signal at given resolution level of such hierarchical data structure is encoded as a synthetic signal and inserted into the multi-threaded stream as a signal with a special name to designate the resolution depth.

Pseudo-code that illustrates an embodiment of bounding box data insertion into a synthetic signal is described in TABLE 3.

TABLE 3

```
Create new parent node if none exists (if the multi-resolution tree
is empty then create a parent node)
    If (depth >= maxDepth) END-OF-RECURSION (do not create
parent levels that exceed a prescribed limit)
    If maximum number of samples in parent node exceeded, then
        UpdateRTSFValue(depth+1) (create another signal level)
        UpdateMinMaxValues(signal, value) (recomputes bounding box
        information)
        FlushNodeAtDepth(depth) (flush if exceed limit; use putValue( ))
    Else,
```

TABLE 3-continued

```
        Append min/max values to synthetic signal called signal_@depth
        (adds new bounding box to synthetic signal stream)
        Invoke putValue(signal@depth, min_max_data) to save
        RTSF stream @depth (recursively exploits putValue( ) technique to
        efficiently encode RTSF stream)
```

After all signal values have been processed, a function FlushTreeNodes(depth=0) is invoked, which is explained in the pseudo-code of TABLE 4.

TABLE 4

```
If (depth >= maxDepth) END-OF-RECURSION (end
condition test for recursion)
    FlushNodeAtDepth(depth+1) (recursively propagate bounding
    box information at this resolution level up to parent level)
```

A function FlushPacketStream( ) performs the task of writing signal packets to the output stream, and most importantly, creates the backward skip pointers using a novel randomization scheme in accordance with some embodiments of the invention.

A packet header such as that shown in FIG. 6 is created.

A backward skip link (pointer) L[0] is defined as follows:

signal.L[0]←signal.L[0].predecessor (nil if this is the first packet written)

A predecessor link for this signal is updated for this signal using the current packet location of this signal:

signal.L[0].predecessor←signal.current_packet_location

A determination of how many primary skip links (L[1], L[2], L[3], . . . etc) are to be updated and written with this packet using the following randomized scheme:

num_primary_links←ceil(signal.priority*k*ceil(log (number of packets)*log($U(1,2)$)/log(2))

The number of auxiliary or redundant links is also randomly determined:

num_aux_links←ceil(signal.priority*k*log($U(1,2)$)/log(2))

The expression $U(1, 2)$ is defined as a random number generator with a uniform probability distribution over the real number range of (1, 2). In essence, the total number of links allowed for the current signal packet is the sum of two completely independent random probability function terms: num_primary_links and num_auxiliary_links.

The num_primary_links and num_aux_links values are proportional to the priority of the signal, (its "VIP-ness"), and are also weighted by a global memory overhead factor k.

These values may be filtered with some degree of quantum granularity so as not for force too many recomputations. The major difference between the number of primary links versus redundant or auxiliary links is that the first contains a logarithmic factor of the number of samples written so far, whereas the latter is independent of the number of samples. The actual value of the links may also be bounded by a global limit on link level depths The lower level links are promoted up by one level up to the highest link level:

for I in [highest link . . . 2]

$L[I] \leftarrow L[I-1]$

L[1]←signal.L[0].predecessor

The signal packet s is appended to output data stream using WritePacket(stream out, signal_packet s).

Finally, signal table properties are updated using a function named, UpdateSignalTableProperties(signal, signal_location, current_packet_location).

Thus, the density of pointers within a span of ordered elements advantageously can be varied dynamically in accordance with variations in the importance of different signal regions, for example. The novel pointer allocation scheme is fast, efficient, and can dynamically adapt to the priorities of signals as well as signal regions.

In accordance with additional aspects of the invention, 'synthetic' signals can be created on the fly for addition to the signal stream. For example, U.S. patent application Ser. No. 11/580,535, referenced above discloses creation of a multi-resolution data tree to represent signal data at different levels of resolution. That application points out that most computer display screens have very limited resolution when compared to the resolution represented in simulation data, for example. Given that typical display screens are 800-1600 pixels wide, it does not make sense to require a waveform display to read the entire dataset, which may include millions or even billions of sample points to and generate the relatively few points to be displayed on the screen.

Figure 7:
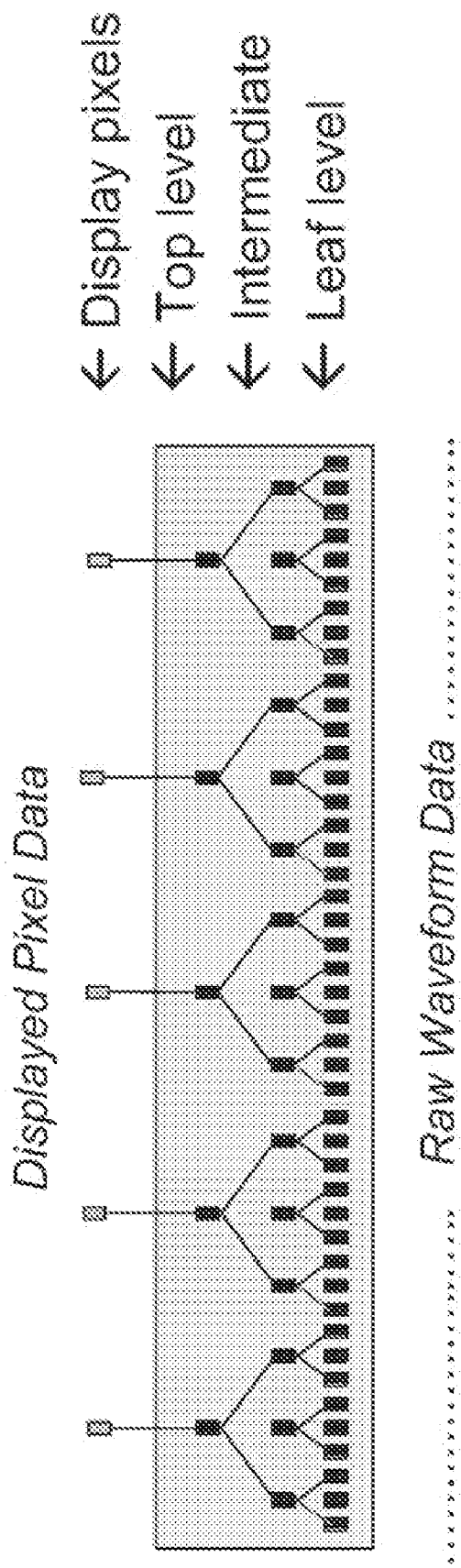
FIG. 7 is an illustrative drawing of a multi-resolution tree structure with nodes that summarize waveform segments at different resolutions.

FIG. 7 is an illustrative drawing of a multi-resolution tree structure with nodes that summarize waveform segments at different resolutions. The above-identified patent application teaches the creation of such multi-resolution trees. A leaf node level contains raw waveform data. An intermediate level contains data that summarizes the leaf node level data. A top level contains data that summarizes the intermediate node level data. The displayed pixels use data from the top level.

Figure 8:
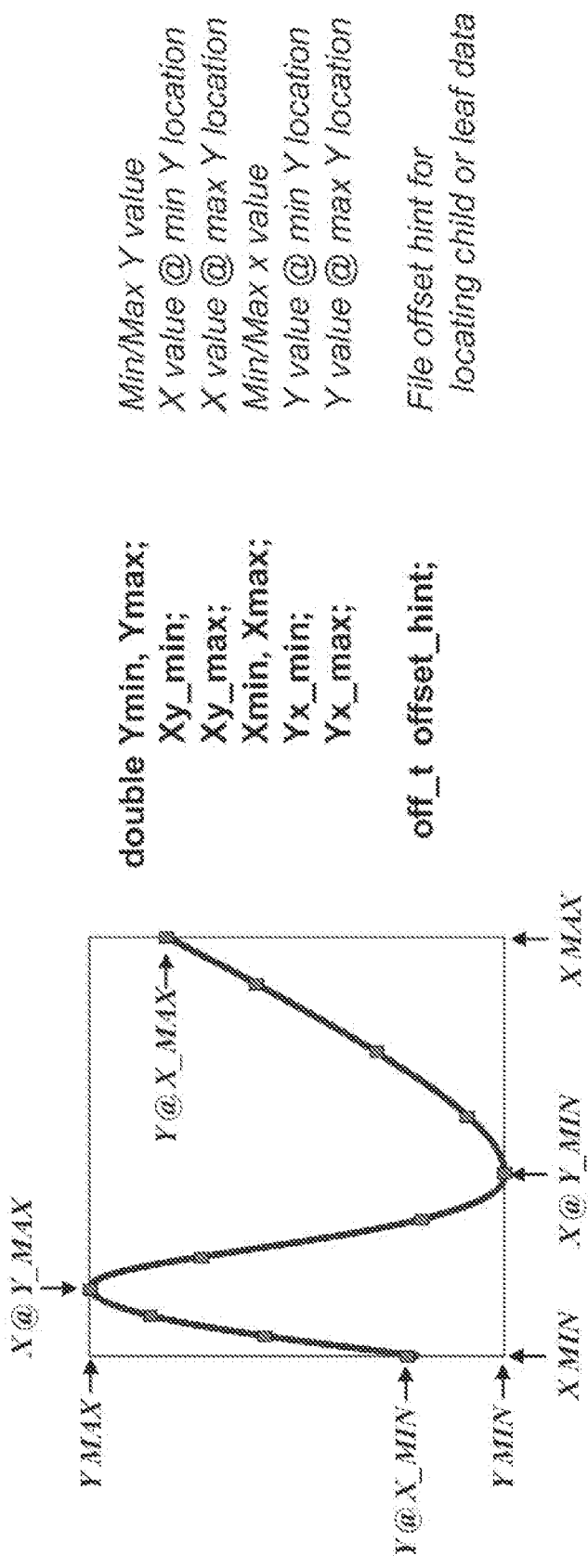
FIG. 8 is an illustrative drawing showing a bounding box that represents a node of the tree structure of FIG. 7.

FIG. 8 is an illustrative drawing showing a bounding box that represents a node of the tree structure of FIG. 7. Minimum and maximum values from a selected interval of a lower level of the tree structure are used to create a bounding box that defines a value in an upper level. A value in such upper level, therefore, in effect, summarizes the lower level values within the selected interval. In other words, the upper level value provide a lower level resolution representation of the lower level values.

In accordance with some embodiments of the invention, the data for each different resolution level is formed into a different signal thread that is interleaved into the signal stream. Such multi-resolution data is 'synthetic' in that it may be derived from the measurement samples produced by the simulation process. Thus, for example, thread B in FIG. 5 may represent a synthetic signal derived from information in thread A. Storing such multi-resolution signals within the stream exploits the inherent memory efficiency, CPU efficiency, and performance gains provided by some embodiments of the invention.

The novel use of reverse skip lists to store high volume packet streams facilitates the use of synthetic signals and post-processing. There are various parameters used to optimize the writing and reading of the signal packets to the database ($M_{GMAX}$, $M_{BMAX}$, and $M_{BMIN}$, $m_D$, and $m_{AS}$, and k, signal.priority). These parameters are initially set to some default baseline values for all signals. However, these parameter values may be dynamically optimized based on the usage patterns of these signals during the visualization and post-processing stages. For example, a user may indicate a greater interest in one signal group than other signal groups. The user may express this interest explicitly by informing the simulation environment framework (referred to here as simply the "environment") via a graphical user interface (GUI) dialog, or such user interest may be determined implicitly through "journaling", which involves recording user behavior and modifying packets and/or index depth to optimize support expected user behaviors. For instance, when a user plots a signal from the database, and the signal was not saved with high priority status (referred to as 'VIP status') at simulation time, the memory management environment can inform the reader library process to upgrade the signal to VIP status by generating additional levels of indexing and appending it to the database. This will speed up all subsequent reads of that signal from the database in the future. And because this fact will be 'journaled', the next simulation run will automatically promote this signal to VIP status. Furthermore, signals that are designated as VIP and are actually accessed by the user could be given a "super-VIP" status, indicating that the user is particularly interested in this signal. Such signals could get even higher resources allocated to them at simulation time.

Further example user behaviors that could merit journaling include indicia of the signals that the user chose to plot and/or load into a post-processing environment. These user choices can be used to influence which signals would merit special treatment in subsequent simulations, such as increased memory overhead allocation (VIP status). Typical examples are of such signals include stimulus waveforms, primary response (circuit outputs) waveforms, and synchronization or handshaking signals such as reset, clock, power_enabled etc, changes of the values of, which tend to be treated as significant "events" to which the circuit needs to respond in a particular manner.

Moreover, journaling of measurements and calculations performed by the user on each signal, or sets of signals can be used to determine what pre-calculations to make at simulation time, thereby speeding up the post-processing and visualization phases. For example, the user may consistently compute the gain of Vout vs Vin or the difference between Vout and Vout_or may consistently seek out zero crossings. This information could be use to offer the ability to pre-compute such measurements at simulation time and to store it as a synthetic signal, thereby speeding up the post-processing and visualization phases.

Based on the journaled information, for example, techniques in accordance with embodiments of the invention can improve the performance of VIP signals by adjusting the signal priority values, thereby changing the frequency of backward pointer links in the signal packets. A higher priority signal would have more primary link levels and/or more redundant links added to its packet streams than a lower priority signal would have.

Moreover, for example multi-resolution data (e.g., RTSF data) can be generated during the visualization phase instead of the simulation phase if simulator memory is to be conserved at all costs. The multi-resolution data that is generated post-simulation to be appended to the database so that subsequent reads of the same signal can be accelerated. Also, post-simulation calculations and measurements can be appended to the database and retrieved very rapidly using the same facilities described by this invention.

It will be appreciated that while most packets will represent direct measurement data produced by the simulator, some of the signals may represent synthetic data derived from the measurement data or produced during post-processing. A synthetic signal, as used herein, is a pseudo-signal that is not an inherent part of the circuit design being simulated. It could be a mathematically derived signal that either describes or summarizes properties about a real signal (e.g., the zero crossing events or phase changes). Or the user might perform some filtering operations on a signal such as smoothing, or noise reduction. The memory management environment can cache that result by creating a synthetic signal and append it to the existing database (or to a separate post-processing database). The priority level of the synthetic signal could inherit the same priority value of the input signal that it was computed from. This fact could be journaled so that the result could be pre-computed or accelerated in future simulation runs. Synthetic signals could also be a meta-data signal that consists of additional higher-order backward links that can be used to accelerate the reading performance of an existing signal. For example, a signal with nominal priority may only have four levels of backward links. But because the user has expressed great interest in the signal, the environment can create a synthetic signal that encapsulates higher order links L4 through L7. Future reads of the signal would use the information in the synthetic link stream to augment the original links saved in the packet streams.

It will be appreciated that one of the things that users often do when simulating is to predefine key signals to be saved or that are used in key measurements. The simulator tool knowing this (usually through an environment such as Cadence's Analog Design Environment) can essentially use that information to create journal hints that can speed up read/access as well as drawing and measurements of these signals. For example on measurements if the simulator knows that the measure will require edge detection then a new synthetic signal can be created that records those edges. Thus, the user himself may indicate what signals are of particular interest.

Some illustrative examples of advantages that can be achieved through techniques in accordance with embodiments of the invention are as follows. Assume, for example, that a user performs a first simulation of a circuit, and a waveform database is created and stored to disk per the present invention. The user then inspects some signals using a waveform browser, choosing some signals of interest to zoom in and inspect in some high degree of detail. From this, the user makes a decision to modify his circuit (e.g. modify some properties such as the size of a transistor) in the hopes of improving the circuit behavior, and then runs a second simulation on the [modified] circuit. The user will now again invoke the waveform viewer and most probably inspect the same signals in a very similar manner to see if his circuit modifications resulted in the desired improvements.

This process may continue for several more iterations and modifications. During the initial simulation, all packets in a given stream are compressed uniformly and with a fixed precision. Further, all signals are given the same priority which essentially means that the number of primary and auxiliary links for any signal will be similar. During the first visualization operations however, the waveform viewer tool records journals) the users actions. Which specific signals did a user select to plot? These signals may be recorded as new synthetic signals which are appended to the first database. Various heuristic formulae may then be applied which can calculate a new priority for a signal based on these kinds of user behaviors. (Example, increment a given signal's priority by some constant factor for each zoom operation that was performed on the signal, and by some other constant factor for each "calculation" a user performs on a signal such as measuring the time difference between two peak Y values of the signal). These heuristically determined priorities may be recorded as additional synthetic signals and appended to the first database.

During subsequent (second, third, etc.) simulations, signals will no longer be assigned equal priorities when calculating the number of primary and auxiliary links. Instead, those priorities will now reflect the amount of interest the user expressed in any given signal by the amount of zoom/calculation etc operations he performed on it. The idea is to adaptively modify these priority values from one simulation to the next, as a function of the users level of interest in any given signal. Signals which were attractive to the user are instead assigned an increasing number of primary and auxiliary links in new databases created by the subsequent simulations, which makes the subsequent viewing of those new database operate even faster for those signals of interest. This means that for the second and subsequent simulations, the simulator consults the synthetic signals which were appended to the first database, and uses that information when deciding the packet structure, link density etc for the second and subsequent databases.

Further, during a first round of waveform viewing the waveform viewer application can keep track of which values/ranges of the independent variable (e.g. time) that the user seems most interested in. For a PLL circuit application, for example, the user may express no interest in the early values of time during which the PLL is locking, but may express a significant interest in the later values of time after which the PLL has locked (Zoom regions will focus on higher time values). By additionally recording this information to the first database as additional synthetic signals, the second and subsequent simulations of the circuit can consult these "zoom region" synthetic signals from the first simulation database, and use this information to determine the compression factors or data representation (such as use of single precision versus double precision floating point representation) when assembling packets for the second simulation database. Packets (in the second and subsequent databases) whose time values are not overlapping with the zoom regions may be assigned a lower resolution (e.g. single precision floating point representation), while packets whose time values do overlap can be assigned a higher resolution (e.g. double precision floating point representation).

During a second waveform inspection, the waveform viewer loads the second database, which is now optimally organized to facilitate rapid viewing of the signals of interest, with highest precision accorded to the zoom regions of most interest to the user. This entire set of operations and optimizations is enabled by the fundamental nature of the packet structure (in which each packet is self contained and independent of the other packets e.g. each packet can have a different degree of resolution for its signals), and by the fact that the reverse skip list employed also allows for dynamic skip factors, redundant links, etc.

Therefore, the use of synthetic signals which are created by a waveform viewing tool and appended to the first database simultaneously enables faster viewing of the same first database when it is later loaded into the waveform viewer (e.g. after a user returns from lunch and wishes to view the data again), and by subsequent simulations of the circuit after say some device properties have been modified in an experiment to improve the circuit.

Figure 9:
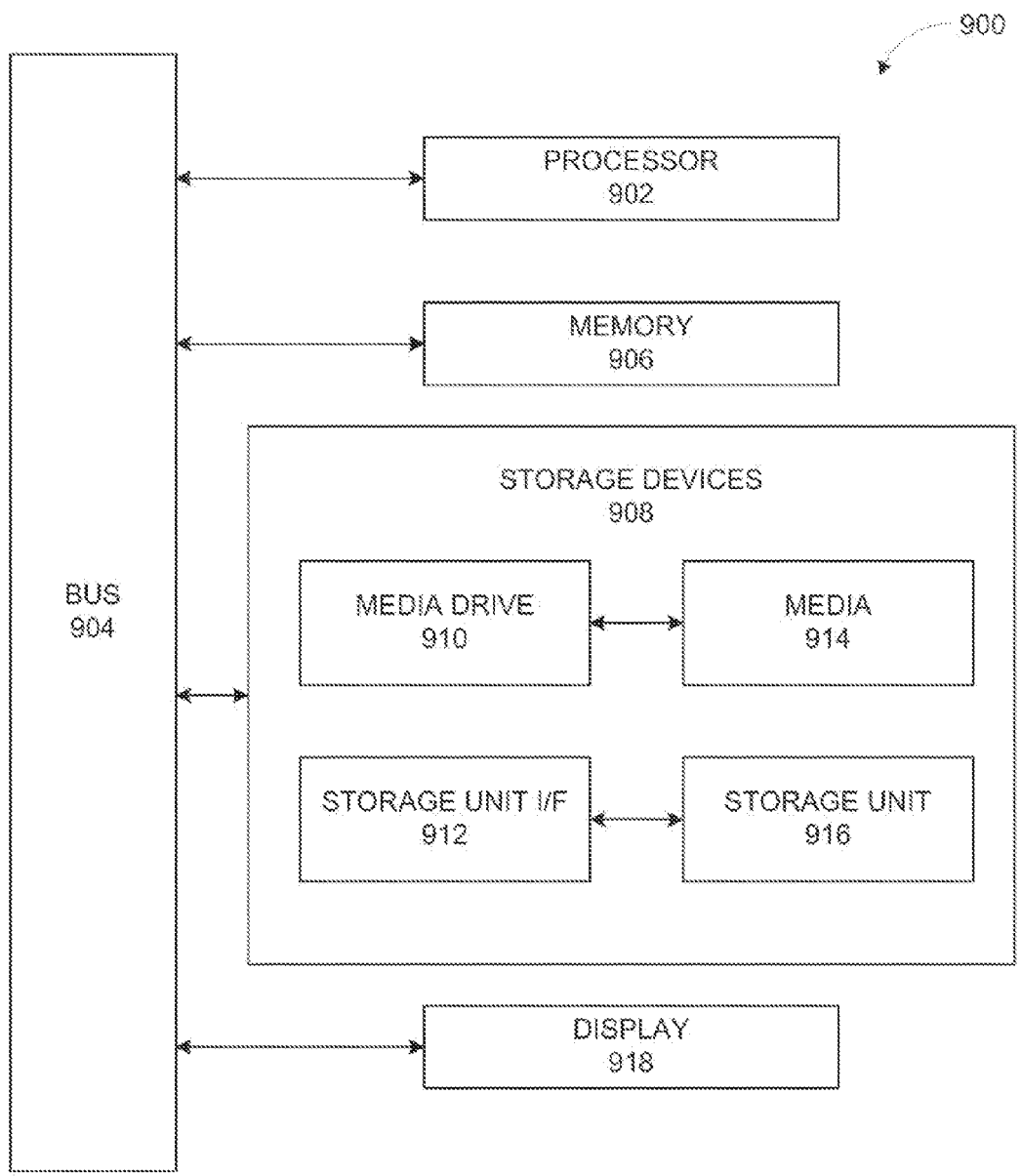
FIG. 9 is an illustrative block level diagram of a computer system that can be programmed to produce a reverse skip list data structure in accordance with some embodiments of the invention.

FIG. 9 is an illustrative block level diagram of a computer system 900 that can be programmed to produce a reverse skip list data structure in accordance with some embodiments of the invention. Computer system 900 can include one or more processors, such as a processor 902. Processor 902 can be implemented using a general or special purpose processing engine such as, for example, a microprocessor, controller or other control logic. In the example illustrated in FIG. 9, processor 902 is connected to a bus 904 or other communication medium.

Computing system 900 also can include a main memory 906, preferably random access memory (RAM) or other dynamic memory, for storing information and instructions, such as code corresponding to pseudo-code of TABLES 1-4 and the FlushPacketStream( ) Process, to be executed by processor system 902. Main memory 906 also may be used for storing temporary variables or for buffering other intermediate information such as stream data in the course of packet formation during execution of instructions to be executed by processor 902. Computer system 900 can likewise include a read only memory ("ROM") or other static storage device coupled to bus 904 for storing static information and instructions for processor system 902. Moreover, the main memory 906 and the persistent storage devices 908 may store data such as simulation waveforms or design database or a computer program such as an integrated circuit design simulation process, for example.

The persistent storage devices 908 may include, for example, a media drive 910 and a storage interface 912. The media drive 910 can include a drive or other mechanism to support storage media 914. For example, a hard disk drive, a floppy disk drive, a magnetic tape drive, an optical disk drive, a CD or DVD drive (R or RW), or other removable or fixed media drive. Storage media 914, can include, for example, a hard disk, a floppy disk, magnetic tape, optical disk, a CD or DVD, or other fixed or removable medium that is read by and written to by media drive 910. Information storage mechanism 908 also may include a storage unit 916 in communication with interface 912.

The (one or more) processors 902 may be programmed using a simulation program to perform simulations of an integrated circuit design. Simulation results in the form of multi-thread streaming data are temporarily buffered in memory 906. Computer programs encoded in memory 906 create packets like that of FIG. 6 that are appended to a reverse skip list structure like that of FIG. 5, stored in persistent memory 908.

The computer system 900 also includes a user interface (UI) display unit 918 that can be used to display information such as simulation waveform results. A user may indicate through interaction with such UI, the signals or portions of a signal that are to be accorded priority status. Packets corresponding to these signals or portions of signals may be allocated a larger number of pointers so as to facilitate retrieval or, for example, may be encoded with greater precision. Conversely, user interaction with such UI display 918 may be monitored and evaluated automatically to infer the signals or portions thereof that are of greatest interest to the user. In response to such inferences, for example, pointer index structures may be created automatically in which a higher density of pointers is provided for signals or portions of signals that are of greatest interest. Moreover, in response to such inferences, packets corresponding to signals or portions of signals that are of greater interest may be encoded automatically with higher accuracy.

In this document, the terms "computer program medium" and "computer useable medium" are used to generally refer to media such as, for example, memory 906, storage devices 908, a hard disk installed in hard disk drive 910. These and other various forms of computer useable media may be involved in carrying one or more sequences of one or more instructions to processor 902 for execution. Such instructions, generally referred to as "computer program code" (which may be grouped in the form of computer programs or other groupings), when executed, enable the computing system 900 to perform features or functions of the present invention as discussed herein.

The foregoing description and drawings of preferred embodiments in accordance with the present invention are merely illustrative of the principles of the invention. For example, although embodiments of the invention are described herein with reference to circuit simulation technology, the principles are applicable to other fields. For instance, very large volumes of data may be produced that represent seismic data, which may be organized monotonically relative to a depth variable. Data in other applications may be organized relative to other variables such as temperature, distance or frequency, to name just a few. Video packets, for example, may be organized using reverse skip lists to speed searches for desired video frames. Moreover, techniques in accordance with embodiments of the invention may be used for medical data such as EKG or EMG signals, satellite and remote telemetry data and financial data such as historic stock prices, for example. Therefore, it will be understood that various modifications can be made to the embodiments by those skilled in the art without departing from the spirit and scope of the invention, which is defined in the appended claims.

The invention claimed is:

1. A method to produce a reverse skip list data structure in a computer readable medium comprising:
   inputting streamed data to a first memory;
   creating a first ordered sequence of packets each containing a portion of the streamed data; and
   transferring created packets in first packet sequence order from the first memory to a second memory;
   wherein creating the first ordered sequence of packets includes providing each of a plurality of respective given packets in the first packet sequence with a respective pointer that skips over at least one other packet in the first packet sequence and indicates a location in the second memory of a different respective packet in the first packet sequence that was transferred to the second memory prior to such providing of the respective pointer.

2. The method of claim 1,
   wherein creating the first ordered sequence of packets each containing a portion of the streamed data occurs in the course of inputting the streamed data to the first memory; and
   wherein transferring created packets in first packet sequence order from the first memory to a second memory occurs in the course of inputting the streamed data to the first memory.

3. The method of claim 1,
   wherein creating the first ordered sequence of packets includes ordering the packets of the first sequence in an order that corresponds to an order in which the streamed data portions contained in such packets are inputted to the first memory.

4. The method of claim 1,
wherein the first memory includes a temporary buffer memory; and
wherein the second memory includes a persistent memory.

5. The method of claim 1,
wherein the streamed data includes first and second data threads;
wherein creating the first ordered sequence includes creating packets each containing a portion of the first data thread of the streamed data; and further including:
creating a second ordered sequence of packets each containing a portion of the second data thread of the streamed data;
transferring created packets in second packet sequence order from the first memory to second memory; and
wherein creating the second ordered sequence of packets includes providing each of a plurality of respective given packets in the second packet sequence with a respective pointer that skips over at least one other packet in the second packet sequence and indicates a location in second memory of a different respective packet in the second packet sequence that was transferred to second memory prior to such providing of the respective pointer.

6. The method of claim 5,
wherein creating a second ordered sequence of packets each containing a portion of the second data thread of the streamed data occurs in the course of inputting the streamed data to the first memory; and
wherein transferring created packets in second packet sequence order from the first memory to second memory occurs in the course of inputting the streamed data to the first memory.

7. The method of claim 1,
wherein the streamed data includes first, second and third data threads;
wherein creating the first ordered sequence includes creating packets each containing a portion of the first data thread of the streamed data; and further including:
creating a second ordered sequence of packets each containing a portion of the second data thread of the streamed data;
transferring created packets in second packet sequence order from the first memory to second memory;
wherein creating the second ordered sequence of packets includes providing each of a plurality of respective given packets in the second packet sequence with a respective pointer that skips over at least one other packet in the second packet sequence and indicates a location in second memory of a different respective packet in the second packet sequence that was transferred to second memory prior to such providing of the respective pointer;
creating a third ordered sequence of packets each containing a portion of the third data thread of the streamed data;
transferring created packets in third packet sequence order from the first memory to third memory;
wherein creating the third ordered sequence of packets includes providing each of a plurality of respective given packets in the third packet sequence with a respective pointer that skips over at least one other packet in the third packet sequence and indicates a location in second memory of a different respective packet in the third packet sequence that was transferred to second memory prior to such providing of the respective pointer.

8. The method of claim 7,
wherein creating a second ordered sequence of packets each containing a portion of the second data thread of the streamed data occurs in the course of inputting the streamed data to the first memory;
wherein transferring created packets in second packet sequence order from the first memory to second memory occurs in the course of inputting the streamed data to the first memory;
wherein creating a third ordered sequence of packets each containing a portion of the third data thread of the streamed data occurs in the course of inputting the streamed data to the first memory; and
wherein transferring created packets in third packet sequence order from the first memory to third memory occurs in the course of inputting the streamed data to the first memory.

9. The method of claim 1 further including:
deterministically selecting for each of different ones of the plurality of given packets, a respective determined number of packets that a respective pointer is to skip over.

10. The method of claim 1 further including:
deterministically selecting for each of different ones of the plurality of given packets, a respective determined number of packets that a respective pointer is to skip over based at least in part upon relative order of the respective packet containing such pointer in the first packet sequence.

11. The method of claim 1 further including:
deterministically selecting for each of different ones of the plurality of given packets, a respective determined number of packets that a respective pointer is to skip over based at least in part upon a number of packets skipped by a pointer of a previously created packet in the first packet sequence.

12. A method to produce a reverse skip list data structure in a computer readable medium comprising:
inputting streamed data to a first memory;
wherein the streamed data includes a multiplicity of respective data threads;
in the course of inputting the streamed data to the first memory, creating a multiplicity of respective different ordered sequences of packets, each corresponding to a respective different data thread;
wherein individual packets of respective packet sequences contain portions of respective data threads of respective packets sequences to which they belong;
in the course of inputting the streamed data to the first memory, transferring created packets of the multiplicity of respective packet sequences in respective packet sequence order from the first memory to second memory;
wherein creating the multiplicity of respective ordered sequences of packets includes providing each of a plurality of respective given packets in each respective packet sequence with a respective pointer that skips over at least one other packet in its respective packet sequence and indicates a location in second memory of a different respective packet in its respective packet sequence that was transferred to second memory prior to such providing of such respective pointer.

13. The method of claim 12,
wherein creating a multiplicity of respective ordered sequences of packets includes limiting packet size of each respective packet based upon a prescribed packet size limit applicable at the time of creation of such respective packet; and in the course of inputting the streamed data to the first memory, adjusting the prescribed packet size limit based at least in part upon the number of different respective data threads currently within the streamed data that is being inputted.

14. The method of claim 12,
wherein creating the multiplicity of respective ordered sequences of packets includes providing to each of a plurality of respective packets in each of the multiplicity of packet sequences a respective number of pointers indicative of locations in second memory of a corresponding number of different respective packets in the same respective packet sequence that were transferred to second memory prior to such providing of the respective number of pointers; and
determining for each respective one of the plurality of packets in each of the multiplicity of packet sequences, a respective number of pointers to provide to such respective packet based at least in part upon at least one of a priority assigned to at least a portion of a respective thread corresponding to the respective packet sequence containing such respective packet and a volume of packets already created in that respective packet sequence at about the time of creation of such respective packet.

15. A method to manage flow of streamed data that includes one or more threads through a first memory comprising:
inputting streamed data that includes one or more threads to the first memory;
in the course of inputting the streamed data to the first memory, creating different respective sequences of packets for different respective threads in the streamed data;
wherein creating different respective sequences of packets includes limiting packet size of each respective packet based upon a prescribed packet size limit applicable at the time of creation of such respective packet;
in the course of inputting the streamed data to the first memory, adjusting the prescribed packet size limit based at least in part upon the number of different respective threads currently within the streamed data that is being inputted; and
in the course of inputting the streamed data to the first memory, outputting respective created packets from the first memory.

16. The method of claim 15,
wherein adjusting the packet size limit includes increasing the packet size limit in response to prescribed increase in the number of data threads currently within the streamed data that is being inputted; and
wherein adjusting the packet size limit includes decreasing the packet size limit in response to prescribed decrease in the number of data threads currently within the streamed data that is being inputted.

17. The method of claim 16,
wherein the prescribed increase is quantized using an expression that includes $M_{GMAX}/2$ CEIL (log 2 num_signals); and
wherein $M_{GMAX}$ represents a total memory allocated to all buffers in the first memory for all packets, and num_signals represents the number of data threads.

18. The method of claim 16,
wherein the prescribed decrease is quantized using an expression tha includes $M_{GMAX}/2$ CEIL (log 2 num_signals); and
wherein $M_{GMAX}$ represents a total memory allocated to all buffers in the first memory for all packets, and num_signals represents the number of data threads.

19. A method to produce a reverse skip list data structure in a computer readable medium comprising:
inputting streamed data that includes one or more threads to a first memory;
creating different respective sequences of packets that correspond to different respective threads in the streamed data;
transferring created packets from the first memory to second memory;
wherein creating the different respective sequences of packets includes providing to each of a plurality of respective packets in each of a plurality of packet sequences a respective number of pointers indicative of locations in second memory of a corresponding number of different respective packets in the same respective packet sequence that were transferred to second memory prior to such providing of the respective number of pointers; and
determining for each of the plurality of packets, a respective number of pointers to provide to such respective packet based at least in part upon at least one of priority assigned to at least a portion of a respective thread corresponding to the respective packet sequence containing such respective packet and a volume of packets already created in that respective packet sequence at about the time of creation of such respective packet.

20. The method of claim 19,
wherein creating different respective sequences of packets that correspond to different respective threads in the streamed data occurs in the course of inputting the streamed data to the first memory; and
wherein transferring created packets from the first memory to second memory occurs in the course of inputting the streamed data to the first memory.

21. The method of claim 19,
wherein the first memory includes temporary buffer memory; and
wherein the second memory includes persistent memory.

22. The method of claim 21,
wherein determining for each of the plurality of packets further includes determining the respective number of pointers based upon an expression that includes a random number with a uniform probability distribution.

23. The method of claim 19,
wherein determining for each of the plurality of packets further includes determining a respective number of primary pointers based at least in part upon a priority assigned to at least a portion of a respective thread corresponding to the respective packet sequence containing such respective packet and a volume of packets already created in that respective packet sequence at about the time of creation of such respective packet and a prescribed probability distribution.

24. The method of claim 23,
wherein determining the respective number of primary pointers includes determining based upon an expression, $$\text{num\_primary\_links} \leftarrow \text{ceil}(\text{signal.priority} * k * \text{ceil}(\log(\text{number\_of\_packets}) * \log(U(1,2))/\log(2))$$

wherein signal.priority represents a priority assigned to the at least a portion of the corresponding thread; k is a memory overhead factor; number_of_packets represents a number of packets created in the respective packet sequence; and U(1, 2) represents a randomly generated number having a uniform probability distribution.

25. The method of claim 19,
wherein determining for each of the plurality of packets further includes determining a respective number of primary pointers based at least in part upon a priority assigned to at least a portion of a respective thread corresponding to the respective packet sequence containing such respective packet and a volume of packets already created in that respective packet sequence at about the time of creation of such respective packet and a prescribed probability distribution; and
wherein determining for each of the plurality of packets further includes determining a respective number of auxiliary pointers based at least in part upon a priority assigned to at least a portion of a respective thread corresponding to the respective packet sequence containing such respective packet and a prescribed probability distribution.

26. The method of claim 25,
wherein determining the respective number of primary pointers includes determining based upon an expression, $$\text{num\_primary\_links} \leftarrow \text{ceil}(\text{signal.priority}*k*\text{ceil}(\log(\text{number\_of\_packets})*\log(U(1,2))/\log(2))$$

wherein signal.priority represents a priority assigned to the at least a portion of the corresponding thread; k is a memory overhead factor; number_of_packets represents a number of packets created in the respective packet sequence; and U(1, 2) represents a randomly generated number having a uniform probability distribution; and
wherein determining the respective number of auxiliary pointers includes determining based upon an expression, $$\text{num\_aux\_links} \leftarrow \text{ceil}(\text{signal.priority}*k*\log(U(1,2))/\log(2)).$$

27. An article of manufacture that includes computer readable media encoded with instructions to perform a process comprising:
inputting streamed data to a first memory;
in the course of inputting the streamed data to the first memory, creating a first ordered sequence of packets each containing a portion of the streamed data;
in the course of inputting the streamed data to the first memory, transferring created packets in first packet sequence order from the first memory to second memory;
wherein creating the first ordered sequence of packets includes providing each of a plurality of respective given packets in the first packet sequence with a respective pointer that skips over at least one other packet in the first packet sequence and indicates a location in second memory of a different respective packet in the first packet sequence that was transferred to second memory prior to such providing of the respective pointer.

28. The article of manufacture of claim 27,
wherein creating the respective sequence of packets includes limiting packet size of respective packets based upon a prescribed packet size limit applicable at the time of creation of such respective packets; and the process further including:
in the course of inputting the streamed data to the first memory, adjusting the prescribed packet size limit based at least in part upon a number of different respective threads currently within the streamed data that is being inputted.

29. The article of manufacture of claim 7,
wherein inputting streamed data includes one or more threads;
in the course of inputting the streamed data to the first memory, creating different respective sequences of packets that correspond to different respective threads in the streamed data;
wherein creating the respective sequence of packets includes providing to each of a plurality of respective packets in each of a plurality of packet sequences a respective number of pointers indicative of locations in second memory of a corresponding number of different respective packets in the same respective packet sequence that were transferred to second memory prior to such providing of the respective number of pointers; and the process further including:
determining for each of the plurality of packets, a respective number of pointers to provide to such respective packet based at least in part upon at least one of priority assigned to at least a portion of a respective thread corresponding to the respective packet sequence containing such respective packet and a volume of packets already created in that respective packet sequence at about the time of creation of such respective packet.

30. A computer system comprising:
a processor;
computer readable storage media;
a communications bus coupling the processor and the media;
wherein the computer readable media encoded with computer program code to perform a process comprising:
inputting streamed data to a first memory;
creating a first ordered sequence of packets each containing a portion of the streamed data;
transferring created packets in first packet sequence order from the first memory to second memory;
wherein creating the first ordered sequence of packets includes providing each of a plurality of respective given packets in the first packet sequence with a respective pointer that skips over at least one other packet in the first packet sequence and indicates a location in second memory of a different respective packet in the first packet sequence that was transferred to second memory prior to such providing of the respective pointer.

31. The system of claim 30,
wherein creating a first ordered sequence of packets each containing a portion of the streamed data occurs in the course of inputting the streamed data to the first memory; and
wherein transferring created packets in first packet sequence order from the first memory to second memory occurs in the course of inputting the streamed data to the first memory.

\* \* \* \* \*